US006981028B1

(12) United States Patent
Rawat et al.

(10) Patent No.: US 6,981,028 B1
(45) Date of Patent: Dec. 27, 2005

(54) METHOD AND SYSTEM OF IMPLEMENTING RECORDED DATA FOR AUTOMATING INTERNET INTERACTIONS

(75) Inventors: Jai Rawat, Sunnyvale, CA (US); Samir Palnitkar, Sunnyvale, CA (US)

(73) Assignee: Obongo, Inc., Redwood City, CA (US)

( * ) Notice: Subject to any disclaimer, the term of this patent is extended or adjusted under 35 U.S.C. 154(b) by 0 days.

(21) Appl. No.: 09/561,449

(22) Filed: Apr. 28, 2000

(51) Int. Cl.$^7$ .............................................. G06F 17/30
(52) U.S. Cl. ........................ 709/217; 715/207; 715/208
(58) Field of Search ........................ 713/202; 707/507, 707/10; 709/217; 717/11; 706/1; 715/207, 715/208, 507

(56) References Cited

U.S. PATENT DOCUMENTS

| | | | |
|---|---|---|---|
| 5,544,322 A | 8/1996 | Cheng et al. | 395/200.12 |
| 5,675,771 A | 10/1997 | Curley et al. | 395/500 |
| 5,694,595 A | 12/1997 | Jacobs et al. | 395/609 |
| 5,764,890 A | 6/1998 | Glasser et al. | 395/188.01 |
| 5,784,463 A | 7/1998 | Chen et al. | 380/21 |
| 5,790,785 A * | 8/1998 | Klug et al. | 713/202 |
| 5,961,593 A | 10/1999 | Gabber et al. | 709/219 |
| 6,151,707 A * | 11/2000 | Hecksel et al. | 717/11 |
| 6,199,079 B1 * | 3/2001 | Gupta et al. | 707/507 |
| 6,249,779 B1 * | 6/2001 | Hitt | 706/1 |
| 6,327,707 B1 * | 12/2001 | McKeeth et al. | 717/11 |
| 6,460,042 B1 * | 10/2002 | Hitchcock et al. | 707/10 |
| 6,496,855 B1 * | 12/2002 | Hunt et al. | 709/217 |
| 6,499,042 B1 * | 12/2002 | Markus | 715/507 |
| 6,589,290 B1 | 7/2003 | Maxwell et al. | |

FOREIGN PATENT DOCUMENTS

EP       0 855 659 A1    7/1998

OTHER PUBLICATIONS

Auto Form Fill—Robo Form—Gator Replacement—Prize Tower.com, google search.*
Alessandro Saffiotti, "Fuzzy Logic in Autonomous Robot Navigation", Nov. 1997.*
Vaughn, Brian et al., "How to Register a Workstation," Zenworks Cool Solutions May 28, 1999; available from internet <URL:http://www.novel.com/coolsolutions/zenworks/basics_ws_register.html>.
"I/Pro Tells Consumers What's In It for Them", by Kathleen Murphy, Web Week, vol. 2, Issue 3, Mar. 1996.
"Microsoft Captures Firefly", by Jim Kerstetter, *PC Week*, Apr. 10, 1998.

* cited by examiner

*Primary Examiner*—Larry D. Donaghue
*Assistant Examiner*—Jungwon Chang
(74) *Attorney, Agent, or Firm*—Michael A. Glenn; Glenn Patent Group

(57) ABSTRACT

A method and system of implementing recorded data for automating interactions which occur across the Internet includes storing data at a central Web server adapted for maintaining a database. Responsive to a program script requesting data, computer program code at the central Web server selectively extracts stored data from the database, manipulates the data in accordance with the request, and supplies the manipulated data in a format desired by the requesting program script.

35 Claims, 6 Drawing Sheets

METHOD AND SYSTEM OF IMPLEMENTING RECORDED DATA FOR AUTOMATING INTERNET INTERACTIONS

BACKGROUND OF THE INVENTION

The present application is related to a application, U.S. patent application Ser. No. 09/516,048, filed Mar. 1, 2000, entitled "WEB SITE REGISTRATION PROXY SYSTEM", now U.S. Pat. No. 6,496,855, issued Dec. 17, 2002, the disclosure of which is hereby incorporated by reference in its entirety.

1. Field of the Invention

The present invention relates generally to transmission of data during Internet browsing, and more particularly to a method and system of implementing recorded data for automating interactions and transactions which occur on the Internet.

2. Description of the Related Art

Presently, many computer users primarily employ Internet browser applications for accessing the World Wide Web (WWW, or the Web) and corresponding via electronic mail (e-mail). The typical browser serves as the means by which a user is enabled to navigate from site to site on the Web, and further serves as the interface through which the user is enabled to interact with those sites by accessing the information content and various services provided.

During any given session of Internet exploration, or "Web surfing," a user is likely to encounter one or more sites which require registration before the full capabilities of the site can be accessed. In fact, sites requiring registration are becoming more prevalent on a daily basis. Web sites engaged in electronic commerce (e-commerce), for example, typically require registration before purchases can be made or items can be placed up for auction by a particular user. As another example, Web sites which host e-mail services necessarily require registration in order to deliver incoming correspondence to the correct recipient.

The registration process may vary in complexity from the very simple matter of entering data into one or two fields to the very complicated matter of providing a social security number, credit card expiration dates, and the like. In any event, a user must navigate to a site's registration page and complete a form by providing information required for registration. As a practical matter, irrespective of the relative complexity of the registration procedure, the user is burdened with the task of recording or remembering the information provided. At a minimum, registration at any given Web site involves providing the site with a user name, or "login" name, and a password. This data is subsequently used by the site to identify the user each time the user logs in; conversely, access to a particular account will be denied or restricted if the proper account information is not entered upon login.

In addition, the user must also keep a record of the sites with which the registration process has been completed or run the risk of having multiple accounts open at the same site inadvertently, which can lead to confusion. In the case where a user intends or prefers to have multiple accounts open at the same site simultaneously, it is still incumbent upon that user to maintain accurate records of user names and passwords in order to access the various accounts.

Even in the case where a user maintains meticulous records of all the requisite information, the correct user name and password information must be provided each time the site is accessed. Typically, a registered user of a particular Web site must navigate to that site's "login page" and complete a form by providing the necessary data in order to access the site's full functionality. In this regard, even accurate records are not useful if they are not accessible; when a user stores registration information conveniently near a home computer, for example, those records will not be of value when that user is attempting to access an account from a computer at another location, such as an office, a library, or a Web cafe. Presently, even wireless devices are Internet-capable, such that a user may access the Web or e-mail accounts from virtually anywhere. Unless such a user commits numerous user names and passwords to memory, or endeavors always to keep written notes within reach, careful record-keeping practices can ultimately prove of limited utility.

Further, many Web sites requests users to supply data through the process of filling out forms independently of any registration or login processes. A browsing user is often required to submit information such as mailing address, billing address, credit card information, or e-mail address. With Internet activity increasing and e-commerce growing at a fantastic rate, there is a continuing and escalating need for a convenient and efficient system for organizing a user's personal account information and, more importantly, implementing that information during Web browsing.

Such a system should take into account the fact that many users are presently accessing the Internet from multiple locations and multiple computer terminals or workstations, and the percentage of users doing so in the future will probably increase. Moreover, to provide maximum convenience and utility, a system organizing and implementing a user's account information should automate much of the interaction which is currently completed manually.

SUMMARY OF THE INVENTION

The present invention addresses the foregoing and other shortcomings of the prior art by providing a system for automating many of the tedious interactions which are required of a user during a typical Internet browsing session.

Briefly, in one embodiment the system of the present invention includes storing a registered user's personal account information in a secure, encrypted central database which is accessible from any Internet-capable device with a single user name and password. For example, a user name and password can be stored in association with an account at a particular Web site, along with the Universal Resource Locator, or URL, of that site's login page. For a second account at a second Web site, the user may have selected a different user name and a different password; this information, likewise, is stored in the central database, along with the URL for the login page of the second Web site. Upon login to the system of the present invention, the registered user has access to the full functional capabilities of the unique interface provided by the system, as well as any and all account information related to that user's various Web site specific accounts. Ideally, this system requires memorization of only a single user name and a single password, regardless of the number of specific accounts which are maintained at a plurality of different Web sites at any given time.

Specifically, the present invention is related to a system providing an interface between the foregoing central database and the various Web sites visited by the user during the course of browsing the Internet. A utility window or navigation bar may be appended to the user's standard browser navigation window, and may be used to interface with the system and to access its capabilities. The programming scripts embodied in, and invoked through, such a utility window expand the capabilities of the standard browser by automating many of the tasks ordinarily completed manually by the user.

According to one embodiment of the present invention, for example, a user's personal information stored in the central database is accessed by the system such that registration forms associated with opening an account may be completed automatically. For example, the system may be adapted separately to maintain a vast database of common Web sites, including the URLs of their respective registration pages as well as the nature and format of their respective registration forms. Convenient hyperlinks may be offered to a user through the foregoing utility window, for example, upon login to the system such that if the user desires to register with a mapped Web site, the program code embodied in the system communicates with the proper site and completes the appropriate sections of the registration form without intervention on the part of the user. In addition, if a user desires to register with a Web site and independently navigates to the page containing the form, the system may be adapted to recognize that the user is attempting to create a registered account which has not previously been recorded, and may prompt the user to record the registration information if desired.

Further, the form filling feature of the present invention is not limited to registration forms. Many other types of forms exist in the Internet universe, and the present invention is adapted to access recorded user data and to implement the same in filling virtually any type of form a user is likely to encounter. In particular, a common type of form which is filled on a regular basis is a login form.

According to another embodiment of the present invention, a user may login to a Web site quickly and easily without having to re-enter a user name and password at each subsequent visit. As noted above, the central database may store a specific user name and password associated with each and every account maintained by the user; when the user wishes to access a particular account at a specific Web site, the interface of the present invention navigates to the proper site using the browser, accesses the appropriate user name and password information from the database, provides the same to the form presented at the Web site's login page, and submits the form automatically, thus logging the user into the account at the site. Additionally, the system is adapted to recognize when a user is attempting to login manually to an account which has not already been recorded in the central database, and prompts the user to record the account information if desired. The user is thereby relieved of the obligation to remember which password is associated with which account at a given Web site.

An important aspect of the present invention is that its operation is not limited with respect to location or to a particular computer terminal or workstation. Upon registering with the system for the first time, the user is subsequently enabled to access its functionality from virtually any Internet-capable computer terminal.

BRIEF DESCRIPTION OF THE DRAWINGS

The above-mentioned and other advantages of the present invention will become more apparent upon examination of the following detailed description of the preferred embodiments thereof with reference to the drawings, in which.

DETAILED DESCRIPTION OF THE PREFERRED EMBODIMENTS

Figure 1:
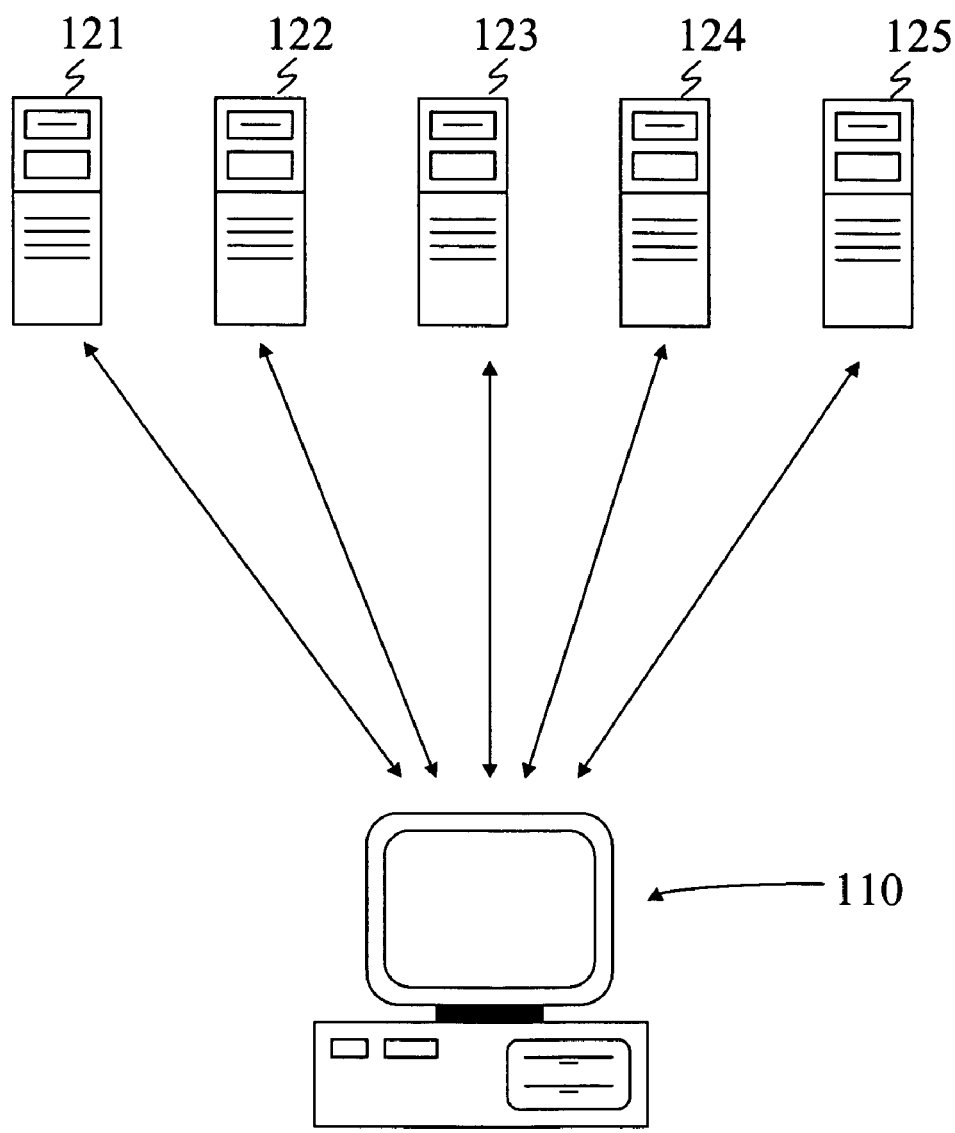
FIG. 1 is a simplified diagrammatic view of the interaction presently required between an Internet user and several sites with which that user may maintain registered accounts.

Turning now to the drawings, FIG. 1 shows a simplified diagrammatic view of the interaction presently required between a typical Internet user and several sites with which that user may maintain at least one registered account. Conventionally, a user connects to the Internet by means of a computer terminal 110 such as a desktop personal computer (PC) or workstation, a laptop, notebook, subnotebook, or hand-held machine, a wireless hand-held device, and the like. Once connected to the Internet, the user accesses e-mail accounts and visits Web servers, or sites, such as those represented by reference numerals 121–125, through means of one or more software applications, such as a Web browser. During the course of visiting the numerous sites which form the framework of the Internet, the user is frequently prompted to register, or to open an account, with a particular site; registration serves both to enable the Web server to identify the user as well as to simplify certain aspects of interaction with the site for the user on subsequent visits.

For example, sites which specialize in auctions, sales of goods, service oriented business transactions, and the like via the Internet (e-commerce), frequently require a user to maintain a registered account at the site before the user may be permitted to use services offered at the site. The amount and type of account information for a particular user maintained at any given site varies considerably, depending upon the nature of the business conducted; some examples of the nature of information requested from the user during registration include first and last name, date of birth, mailing address, gender, social security number, credit card numbers and expiration dates, mother's maiden name, and so forth. Billing addresses and preferred shipping addresses are common data requested by e-commerce sites specializing in the sale of goods. In theory, the sites' maintaining respective databases of such information for a registered user offers the user convenience and efficiency upon subsequent visits to the Web site.

In practice, however, registering with Web sites often places a significant burden on the user. Providing the site with required or requested information generally involves completing and submitting a form. Completing such forms is onerous, and unavoidably introduces the possibility of error, such as misspellings or transposition of numbers, with every submission. Additionally, once the form has been submitted and the registration process is complete, it is incumbent upon the user to remember the user name and password required to access the registered account.

Looking more closely at FIG. 1, the effect of a user's maintaining an account at a plurality of sites is apparent. At a minimum, registration with a Web site, such as sites 121–125 in FIG. 1, requires creating an account which can be accessed only by supplying the correct user name and password during login. That is, in order to access the full range of services provided at a particular site upon subsequent visits, a user is required to submit, through a computer terminal 110, the user name and password selected originally during the registration process.

As is evident from inspection of FIG. 1, a user having a separate account at each of sites 121–125 is required to maintain accurate records of at least five separate user names and passwords. While certain of these user names and passwords may be used for more than one account, users often feel that a different user name and password for each account is preferable for security reasons.

During a typical Web browsing session, a user may wish to login to a registered account at a particular Web site, for example, site 121 in FIG. 1. To login to site 121, the user must first navigate to the correct login page associated with site 121. Upon arriving at the login page, the user is presented with a login form, into which the user must enter the correct user name and password in order to access the account. When the form is completed and submitted, the user is logged into the appropriate account at site 121. If the user then wishes to login to a different registered account which may be at a different Web site, such as site 122 in FIG. 1, for example, the above process must be repeated at the appropriate login page for site 122.

In the case where a user is not registered with a particular site, such as site 123 in FIG. 1 for example, the user may be required to register prior to making full use of the services available. To register with site 123, the user must first navigate to the correct registration page associated with site 123. Upon arriving at the registration page, the user is typically presented with a form, into which the user must enter a wide range of registration information in order to create an account. When the form is completed and submitted, the user may subsequently login to the newly created account, for example, in the manner described above.

In any event, account data must be transmitted between the user's terminal 110 and the various sites 121–125 each time the user wishes to login to a particular account; these data transmission interactions are represented by the arrows in FIG. 1. The interaction between the user and the Web site, required in the name of "convenience," is ultimately tedious and necessarily subject to error. Further, as noted above, the data required during the registration and login procedures are typically unique for each account, requiring the user to remember such data or to record it in a convenient, yet secure, location.

Figure 2:
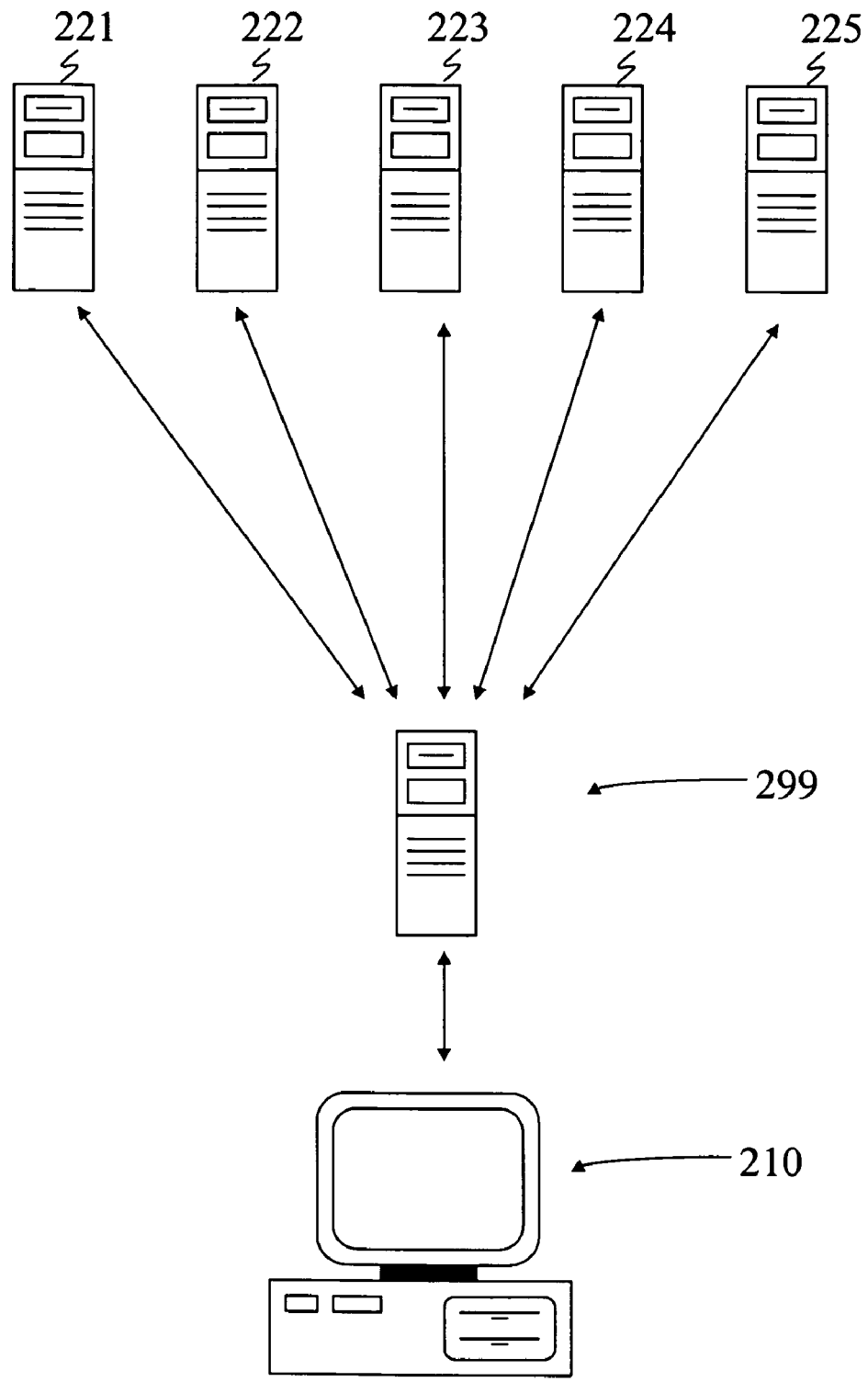
FIG. 2 is a simplified diagrammatic view of the interaction required between an Internet user and several sites with which that user may maintain registered accounts, with the system of the present invention acting as an intermediary.

FIG. 2 is a simplified diagrammatic view of the interaction required between an Internet user and the system of the present invention acting as an intermediary between the user and the various sites with which that user may maintain registered accounts. As illustrated in FIG. 2, the user's computer terminal 210 corresponds to the computer terminal 110 illustrated in FIG. 1. As discussed above, this computer terminal 210 may be any type of Internet-capable machine. Importantly, the method or means by which the computer terminal 210 is connected to the Internet is immaterial. The connection may be through traditional land-line telephone "dial-up" service, Digital Subscriber Line (DSL) service, fiber-optic or cable modem connections, wireless or satellite communications, T-1, T-3, ISDN, network and the like.

Once the connection to the Internet is made, irrespective of the method, the user may employ a software application, such as a Web browser installed on the computer terminal 210, for example, to navigate to a Web site hosting a centralized server and database, such as indicated by reference numeral 299. In the several embodiments of the present invention, the user may open a registered account at the central, Web-based server 299. This registration procedure, as with typical Web site registrations, requires the user to select a user name and password for identification and security purposes, respectively. Upon registration with the central server 299, the user may login to the registered account on subsequent visits by completing and submitting the login form with the correct user name and password. The foregoing procedures are not substantially different from the typical registration and login procedures required by ordinary Web sites. The present invention provides substantial benefits in terms of convenience and utility, however, after the user is logged in to the registered account at the central server 299.

For example, as is illustrated in FIG. 2, the user need only login once, to the central server 299, during a particular Web browsing session; subsequent form filling and login procedures at various other sites require little or no interaction on the part of the user. Data transmission interactions are represented by the arrows in FIG. 2. With respect to form filling or registration procedures, for example, the central server 299 may handle all data entry, completing forms automatically; the user need only review the information for accuracy and submit the completed form. With respect to subsequent login procedures for registered accounts at other Web servers such as 221–225, the central server 299 may handle the navigation, data entry, and login form submission tasks automatically, logging the user in to a desired account at a particular Web site with virtually no action required by the user.

The central server 299 is adapted to maintain a detailed database for the user, including a vast array of personal information supplied by the user. The data recorded may be both general as well as account-specific. For example, general, or global, information may include first and last name, primary billing address, and social security number, and the like; this information is typically constant, irrespective of the Web site with which an account may be maintained. Examples of account-specific information may include user name and password, URL of the login page for the account, favorite genre of literature, and the like; this information may vary according to the information most relevant to the particular site with which the account is maintained.

Importantly, the foregoing general and account-specific information recorded in the database is easily accessible to the user, through login with the central server 299, and may be transmitted at appropriate times automatically through the functionality of the system as set forth in detail below. In this regard, the user name and password associated with the user's registered account with the central server 299 become global; the user need only remember these two items of information to allow the system of the present invention, through the central server 299, to serve as an interface with the rest of the Internet universe. The user is thus relieved of the burden of remembering, for example, the URL of a site's login page along with the user name and password selected for a particular account at that site.

Figure 3:
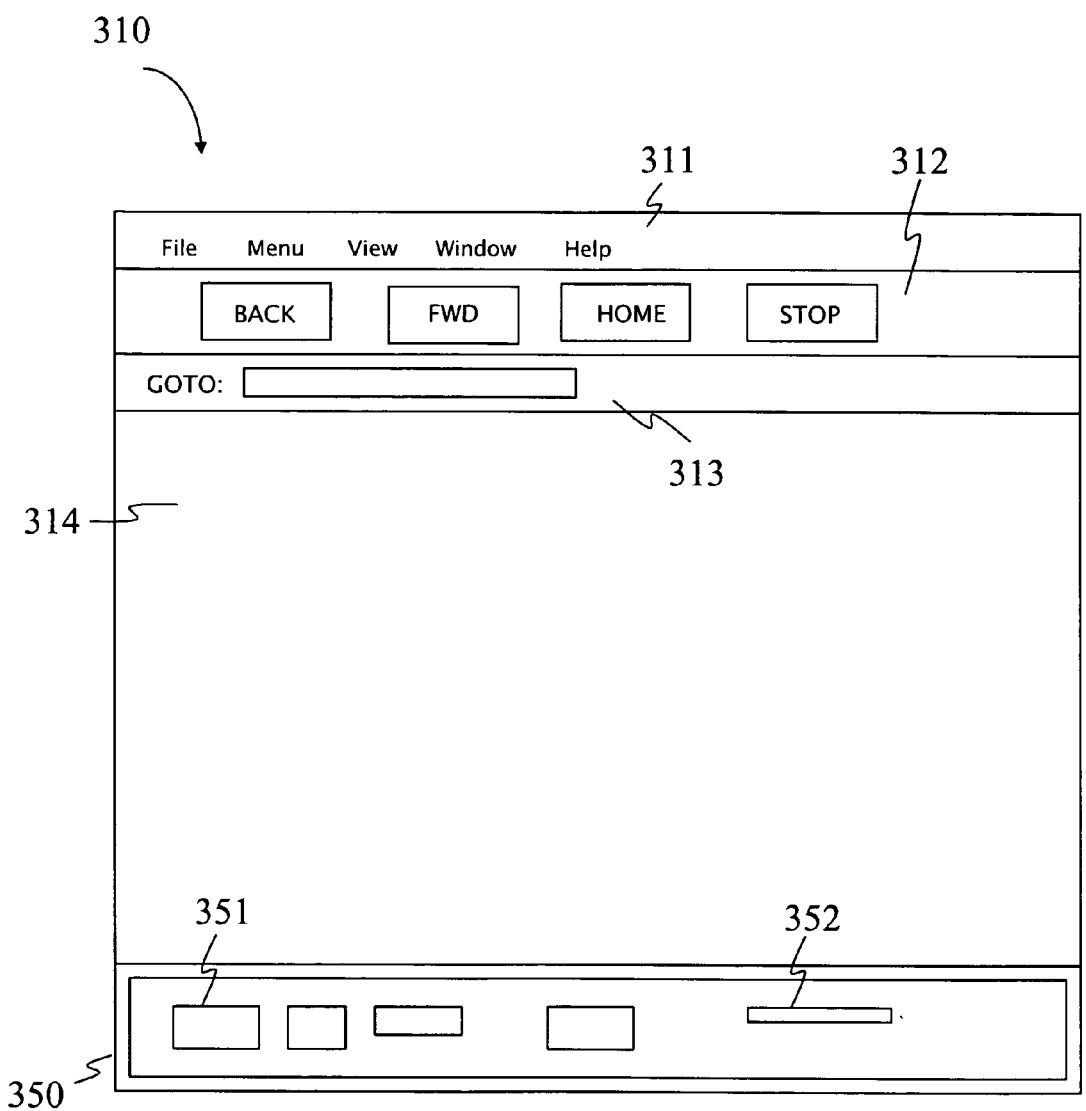
FIG. 3 is a simplified view of the Graphical User Interface presented by an ordinary Web browser application modified to include one embodiment of the interface of the present invention.

In one embodiment of the present invention, a unique interface is provided for accessing the functionality of the system. FIG. 3 is a simplified view of the Graphical User Interface (GUI) presented by an ordinary Web browser application modified to include the expanded interface of the present invention. A conventional Web browser application provides the user with a GUI 310 through which interaction with the Internet is enabled. In a standard configuration, the GUI 310 may include a menu bar 311 for interacting with the browser software, a control bar 312 for navigation, data management, and other purposes, and a text box 313 for entering text, such as the URL of a desired Web site, for example. These elements are common in the art. The primary element of the browser GUI 310 is the navigation window 314, in which the contents of the various Web sites and pages are displayed; Web site content includes, for example, text, video, hyperlinks to other Web sites, and interactive forms which must be completed and submitted.

As can be seen at the bottom of FIG. 3, the Web browser GUI 310 modified in accordance with the present invention includes a utility window 350 appended to the navigation window 314. In this embodiment, the utility window 350 serves as an interface for accessing the various capabilities of the system; the requisite code for expanding the capabilities of the browser to include the utility window 350 may be downloaded and installed into the user's computer terminal 210 automatically upon registration with the central server 299 in FIG. 2, for example. As an alternative, the browser software can be modified independently of the registration process, such as, for example, after the user already has a registered account and wishes to access that account from a computer which does not already have the software for the utility window 350 installed.

Typical Web browser software applications support such inclusion of third party software code which expands the capabilities of the browser or the GUI 310. This support enables a programmer to employ standard programming techniques, embodied for example, in JavaScript® or other programming languages, to modify the original code of the browser software to a limited extent, including the addition of functional elements to the GUI 310 such as the utility window 350 of the present invention. The code may be written so as to recognize certain events, such as when the navigation window 314 has been moved, resized, or maximized by the user, for example. In this embodiment, the utility window 350 may "follow" the navigation window 314 around the user's computer display, being resized or moved, accordingly, at each respective event. As an alternative, the utility window 350 may be adapted to be stationary, irrespective of resizing or movement events associated with ordinary use of the browser's navigation window 314. Alternatively, the original code of the browser software may be modified such that the utility window 350 may be embedded inside the browser GUI 310 itself.

As indicated in FIG. 3, the utility window 350 may include a plurality of operative buttons 351 or drop-down menus 352, for example, through which the user may have access to the various functions supported by the system. The particular configuration illustrated in FIG. 3 is provided by way of example only; the functions supported by the utility window 350, the manner in which those functions are displayed through the inclusion of buttons 351 or drop-down menus 352, and even the location of the utility window 350 relative to the navigation window 314 may be suitably altered for different applications or preferences. In this regard, it is preferable that the functionality of the utility window 350 be supported by program code at the central server 299, not on the user's computer terminal 210 itself.

It will be appreciated by those of skill in the art that appending the utility window 350 to the navigation window 314 is a matter of inserting a small amount of program code, such as a simple script, for example, into the browser software. If the underlying functionality of the interface accessible through the utility window 350 were embedded in the code installed on the user's machine, however, then it would be incumbent upon the user to download and to install improvements and updates in the code. Installation of an entirely new or updated version of the utility window 350 itself would be required for every computer terminal, such as 210 in FIG. 2, from which the system is accessed. The system of the present invention is simplified, however, to the extent that the code installed on the computer terminal 210 merely modifies the browser software to create the utility window 350 and, in some instances, supports the "following" function described above. The real functionality of the interface, on the other hand, is provided in the programming at the central Web-based server 299, and is only imported into the utility window 350 upon each login with the system.

As noted above, the utility window 350 serves as a front-end interface between the user and the system; the system, in turn, provides an interface between the central server 299 of FIG. 2 and the various sites visited by the user, automating certain tedious tasks commonly encountered during Web browsing. In particular, the functionality provided by the system is substantially as follows: effective universal Internet identity and e-mail filtering; automatic form filling for virtually any form encountered during Web browsing; and automatic login to sites where a registered account is maintained. These functional aspects of the system are addressed in detail below.

As noted above with reference to FIG. 2, upon registration with the central server 299, the user has an effective universal user name and password. Once logged into the registered account with the central server 299, the user need not remember any additional passwords or other information which may have been disseminated to the various Web sites 221–225 for the purpose of registering or maintaining an account therewith. The requisite information is stored on the central server 299 and is readily accessible by the user once logged in to the system. In addition to being relieved of the burden of remembering and organizing an overwhelming amount of information, another benefit to the user of the system of the present invention is that the universal user name and password facilitates e-mail filtering.

Figure 4:
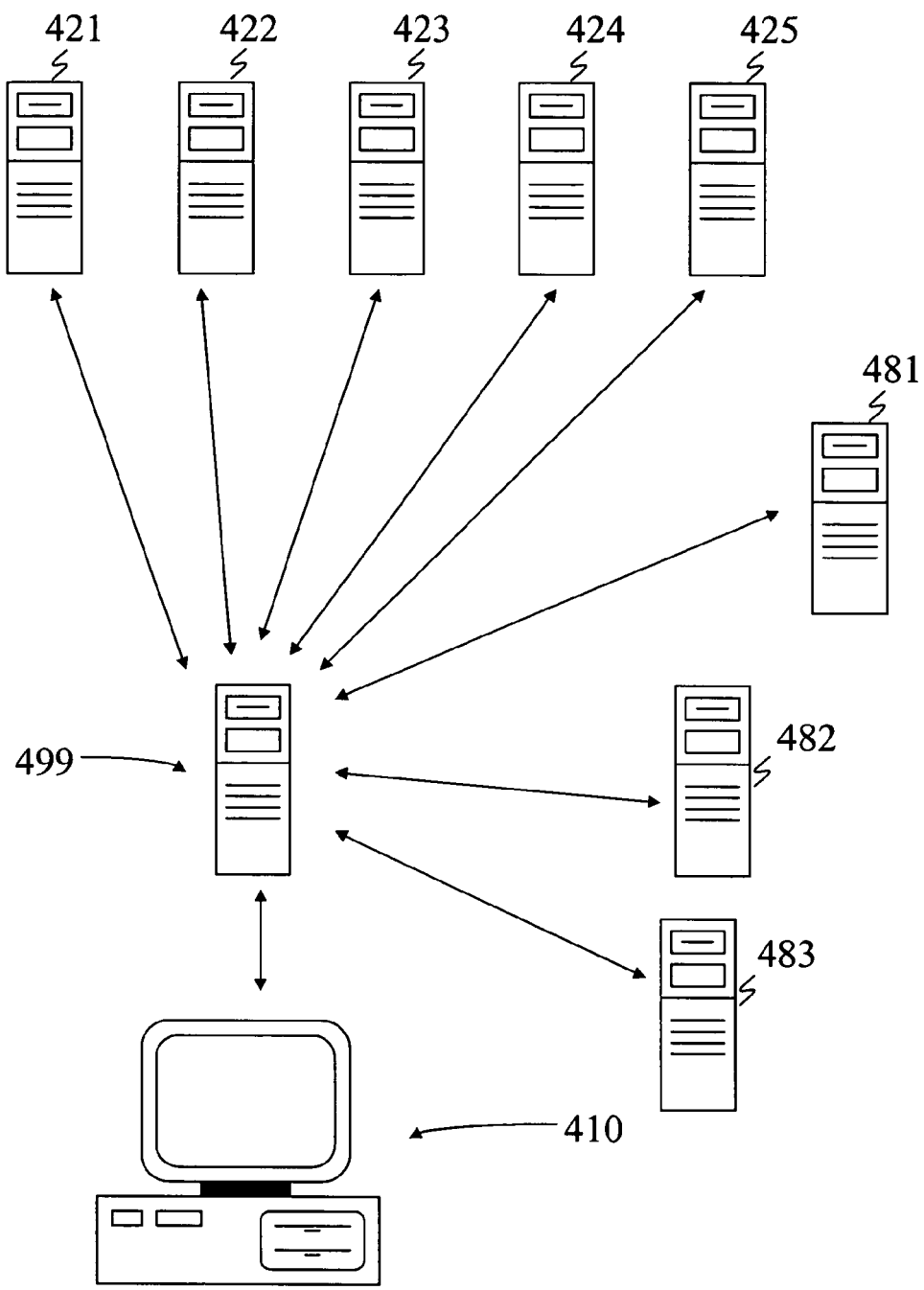
FIG. 4 is a simplified diagrammatic view of the interaction between the central server of the present invention and several e-mail servers with which a user maintains registered accounts.

FIG. 4 is a simplified diagrammatic view of the interaction between the central server 499 of the present invention and several e-mail servers 481–483 with which a user maintains registered accounts. The central server 499 corresponds to that represented by reference numeral 299 in FIG. 2, and the user's computer terminal 410 corresponds to that represented by reference numeral 210 in FIG. 2. Various Web sites 421–425 are shown in FIG. 4 along with a plurality of e-mail servers, denoted as servers 481–483. The e-mail servers 481–483 may, for example, correspond to a user's home e-mail account, school e-mail account, and work e-mail account, respectively. It will be appreciated that a user may maintain more or fewer than three e-mail accounts, and furthermore that more than one e-mail account may be maintained at a single e-mail server; accordingly, the arrangement of FIG. 4 is illustrated by way of example only.

According to one embodiment of the present invention, a user may be provided with a universal "virtual" e-mail address upon registration with the central server 499. This universal e-mail address is characterized as virtual because the system may not actually maintain a full service e-mail account for the user at the central server 499, but rather only function to forward incoming mail to one or more of a plurality of registered e-mail accounts at one or more of a plurality of e-mail servers designated by the user. For example, e-mail delivered to the user's universal virtual e-mail address at server 499 may be selectively forwarded to a single account at e-mail server 481 exclusively, or it may be selectively forwarded to one or more registered accounts at all of the e-mail servers 481–483. In any event, the user's friends, relatives, business contacts, and others representing the entire Internet universe all will be sending electronic correspondence to a single address at the central server 499, where it may be directed according to the user's preference.

In addition to simply forwarding incoming e-mail to an account maintained at remote e-mail servers 481–483, the incoming mail may be parsed, for example, to determine its origin. In this manner, e-mail originating in a particular domain, for example, may be forwarded to a first account specified by the user, while e-mail originating in a different domain may be forwarded to a second specified account.

It will be appreciated that the utility of such a universal virtual e-mail address may be facilitated by the additional feature of allowing the user to manipulate certain options, such as the e-mail address or addresses to which incoming e-mail should be forwarded, and the conditions under which such forwarding is desired. For example, upon login with the central server 499, the user may be allowed full access to change the designated addresses, or to reassign the destination of e-mail originating from a particular domain; since the forwarding addresses can be changed at the central server 499, the user is thus relieved of the burden of informing all Internet contacts of a change in Internet Service Provider (ISP) or other event which may necessitate a change in e-mail address. Ideally, the user may be enabled to decline acceptance of certain unsolicited e-mail ("spam") outright, such that all mail originating from a particular location, for example, is returned to the sender or otherwise rejected in the future.

These e-mail preferences may be stored as a user profile database record associated with a particular universal virtual e-mail address at the central server 499. The registered user may be able to invoke the program code which accesses this data and allows alteration thereof through the utility window 350 discussed above with reference to FIG. 3.

The foregoing functionality may be implemented through program code at the central server 499. In operation, incoming e-mail addressed to a user's universal virtual e-mail address may be parsed upon arrival at the central server 499; origin and destination address headers of e-mail packets are commonly parsed by e-mail servers so as to enable proper delivery of electronic correspondence. In accordance with this embodiment of the present invention, however, the parsed data may additionally be compared to the user preferences associated with the universal virtual e-mail address stored in the database at the central server 499, and the address headers may be altered accordingly. Upon completion of the comparison and the alteration of the address headers, the e-mail may be forwarded to the destination designated by the user.

Figure 5:
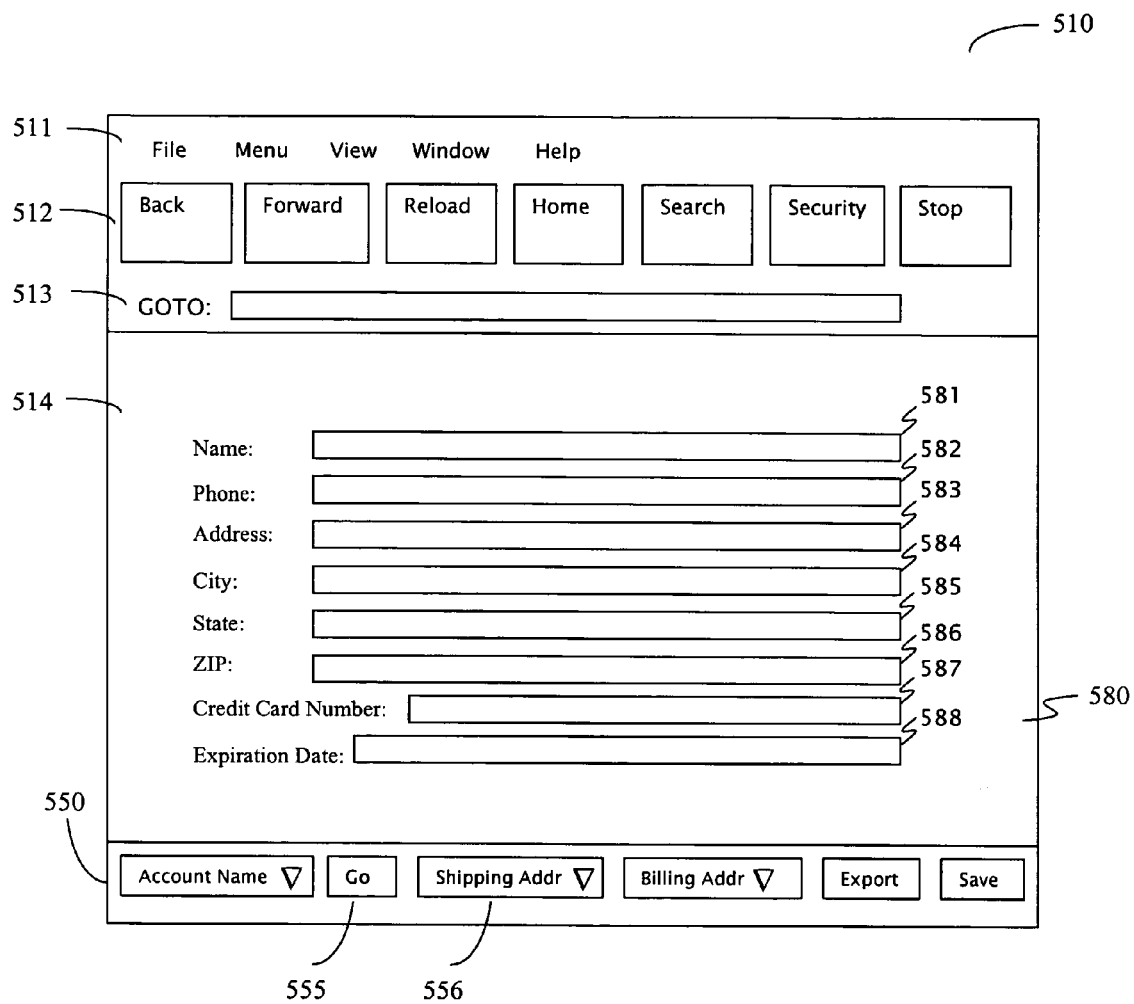
FIG. 5 is a simplified view of a typical form which may be encountered by a user during an Internet browsing session.

Web sites often request that a browsing user supply information, and many of the most popular Web sites, particularly those engaged in e-commerce, actually require as much. As a consequence, a user is often faced with the onerous task of filling out forms during any given Web browsing session. FIG. 5 is a simplified view of a typical form 580 which may be encountered by a user during an Internet browsing session.

In addition to the form 580 itself, FIG. 5 also shows the entire browser GUI 510, complete with the standard menu 511, control bar 512, text box 513, and navigation window 514, in which the form 580 is displayed. The GUI 510 illustrated in FIG. 5 has been modified to include the utility window 550, through which the various functions supported at the central server, such as server 299 or 499, may be accessed. In particular, the utility window 550 includes at least one operative button, such as button 555, which enables access to the automatic form filling feature of the present invention. As an alternative, access to the automatic form filling feature may be provided by means other than a button, for example, through a drop-down menu such as 556.

It will be appreciated that the particular form 580 illustrated in FIG. 5 is representative only; even forms requesting identical data may require submission of that data in different formats. For example, the "Name" field 581 may be subdivided such that a different form may request the same data in three different fields corresponding to last name, first name, and middle name. Likewise, the "Phone" field 582 may be subdivided into three different fields corresponding to area code, exchange, and last four digits; a fourth field may be included for an extension number. Similarly, various forms additionally include drop-down menus or radio buttons wherein the user is requested to select, for example, an age range, an occupation or title, or a preferred credit card type from a limited list.

As described above, the system of the present invention maintains detailed records of information provided by a user both during the registration process and subsequent to registration, at the user's discretion. That is, when a user creates a registered account at the central server, the server creates a database record for that particular user; various user data may be retained. The server may request information from the user in as granular a format as possible; that is, telephone numbers, for example, may be segmented into at least four fields corresponding to country code, area code, full telephone number, and extension. As another example, names may be stored at the server in first name, middle name, last name format rather than as a single field. In this manner, the system of the present invention may be adapted to provide data to various forms requiring data in any one of numerous formats.

By way of background, the forms encountered during Web exploration are encoded in the Hyper-Text Markup Language (HTML) documents, or pages, visited by the user during browsing. Any given HTML page may include one or more forms, distinguished in the underlying HTML code. The system of the present invention utilizes program code at the central server to parse the HTML pages as the user's browser navigates from page to page. The program code is adapted to identify text strings in the HTML code which represent forms embedded therein; each form contains one or more "meta types" recognizable by the system. Each meta type represents a logical data block comprising one or more information fields which are logically related in a meaningful way. Each information field, in turn, has a particular format associated therewith. The foregoing hierarchy of form components assists the system in assigning the granular user data to the correct location in the form during the form fill process.

In this regard, it will be appreciated that classifying different types of data according to meta type enables the system to approach the task of completing forms in an efficient manner which minimizes system overhead and user inconvenience. Either before or during the form fill process, for example, each meta type in its entirety, along with the specific data used for filling its fields, may be selected independently; that is, the user may employ drop-down menus or other GUI mechanisms provided in the utility window to select from a plurality of previously stored data within a given meta type. The interface in the utility window may be adapted to accommodate such selection through inclusion of a drop-down menu for each meta type, for example.

The database at the central server may record a plurality of data "profiles" for each meta type; each profile may be identified by a unique nickname and accessible through the utility window interface. For example, the user may record two credit card profiles, nicknamed "CreditCard1" and "CreditCard2," as credit card meta types, or two shipping addresses, nicknamed "Home" and "Work," as shipping address meta types. Selection of a particular profile from the interface in the utility window causes all of the data associated with that profile to be inserted in the correct field in a form requesting some or all of the data from that meta type.

Presented with a form to fill, the user may select the data to be used for the individual meta types for billing address, credit card, and shipping address independently. Similarly, given a filled form presented to the user for approval, the data associated with an entire meta type may be changed, through selection of a different profile in the utility window interface, while the remainder of the filled form is left untouched. Where a form has been filled with a desired billing address and credit card information, for example, but the user decides to change the shipping address before submitting the form, an option in the interface allows the user to select from one of a plurality of previously recorded shipping address profiles. Similarly, the user may be enabled to select from one of a plurality of previously recorded billing addresses or credit cards.

With the hierarchy described above in mind, and looking more closely at the form 580 of FIG. 5, it will be understood that the various fields required in any particular form, such as fields 581–588, may be recognized by the system of the present invention as related data. As an example, the "Address" field 583, the "City" field 584, the "State" field 585, and the "Zip Code" field 586 may collectively be associated with an address meta type, since these logically related fields are all necessary for defining a specific mailing address. Similarly, the "Credit Card Number" field 587 and the "Expiration Date" field 588 may be combined in a credit card meta type. Additionally, meta types may have one or more defined sub types; for example, billing address information and shipping address information may be recognized as two distinct sub types having the same general data components.

In any given form similar to the exemplary form 580, information may be requested in any one of various formats; with respect to the "State" field 585, for example, the form may request that the name of the state be spelled out completely, or the two letter state abbreviation may be required. Alternatively, the state may be selected from a drop-down menu, for example, or other type of list. By recognizing the particular format required by the form, the system of the present invention is adapted to provide the requisite information in the proper configuration such that it is accepted by the server to which the completed form is submitted.

In accordance with one embodiment of the present invention, the user data stored at the central server is extracted from the database and manipulated so as to conform with the formatting requirements of the form by the program software at the server. The properly formatted user data is subsequently transmitted to the user's computer terminal; there, the forwarded data may be used to fill a desired form such that the user need not enter the information manually. While the number, type, and format of forms a user may encounter on the Internet are as varied as the number of Web sites requesting their completion, the system of the present invention recognizes any given form as falling into one of two broad categories: those forms which have been mapped into the system's database; and those forms which have not been mapped.

In addition to maintaining a database of user information at a central Web-based server, the system of the present invention is adapted to maintain a database of form data related to the numerous forms which may be encountered most often by users browsing the Web; these forms, required or requested by the most popular or most frequently visited Web sites, for example, may be mapped. Mapped forms have been parsed, for example, by a software script adapted to read the underlying HTML code of the Web page containing the form.

The mapping process enables the system to recognize a previously mapped form upon subsequent encounters therewith; recognition of a particular form's fields and structure, in turn, enables the program code at the server to input the correct user data into each field, in the proper format, efficiently and systematically. Accordingly, mapping a form may involve all of the following: examining the underlying HTML code for the purpose of analyzing the form's structure and arrangement; identifying the required fields, the optional fields, and the requested format of each; matching the form fields with the user data fields in the database to which they correspond; and recording all of the foregoing information under a unique identifier string through which the system may prospectively identify that particular form.

Some or all of the elements of the mapping process may incorporate both program software and operator intervention. For example, while the HTML may be parsed and a list of fields may be acquired automatically by a software script, identifying a particular field as optional, as opposed to required, within the structure of a given form may require human input. As another example, after the form has been mapped in its entirety, automatically operating software code at the server may be programmed to detect the fact that the form's structure has subsequently changed, but an operator may be required to evaluate the extent of the change or to update the form's record in the central form database.

Once the HTML has been parsed at the central server, the code may be analyzed such that the structure of the form is known. Fields and formats requested in the form may be identified and matched in the code; that is, upon analysis of the HTML in conjunction with an inspection of the Web page including the form, the type and nature of the information requested, as well as the format in which that information is desired, can be determined with particularity. In this manner, the system may be adapted to determine if the form expects a "Birth Date" date field to be filled in MM/DD/YY format, on the one hand, or MM/DD/YYYY format, on the other; the "Birth Date" field for the particular form may be mapped into the database accordingly.

The HTML, of course, includes the URL of the page which contains the form, and that URL, in turn, contains, inter alia, a string representing the Web site's domain name. The program script which is assigned the task of parsing the HTML preferably assigns a unique identifier to the form which is analyzed. The unique identifier may include a string of all the fields required by the form in addition to a string extracted from the URL, such as the domain name, for example. The analyzed fields and formats required or requested by the form are stored in a form database at the central server under the unique form identifier.

The net result of the foregoing mapping operation is that a particular form is parsed, its structure is analyzed, and an identifier string is created and assigned such that the system can subsequently recognize that form. The identifier string preferably includes a text string comprising a concatenation of all the required fields in the form, all the optional fields in the form, and the domain name, all of which are extracted from the HTML code. The system maintains detailed records of the form structure including the meta types and sub types present, the fields associated with each, and the particular format required for each field. Once the form is mapped in this level of detail, it is a simple matter of matching the form data fields with the granular user data stored in the database to insert the correct information into the proper field in the appropriate format.

Certain forms encountered by the user may not be mapped, or cannot be mapped, either entirely or in part. Given the vast number of forms in the Internet universe, it is unlikely that any system will be able to map and to maintain a catalog of every form. Further, certain forms may be dynamic, thus frustrating attempts to create a meaningful map. As an example, consider a user at an e-commerce site, selecting various items for purchase. When the user completes the selection process, the e-commerce Web site's "check out" page typically displays a form which includes fields for a billing address, a shipping address, and so forth. Additionally, the form usually includes fields related to one or more of the following: offering the user the option of changing the desired quantity of selected items; offering the user an additional item at a discounted price based upon the user's previous behavior; special offers; and so forth. These additional fields are dynamic to the extent that they are not always present in the standard structure of the form, and are variable as a function of the user's actions at the site.

It will be appreciated by those of skill in the art that the HTML underlying the form may provide little or no assistance in the mapping process, particularly in the case of dynamic forms. In certain cases, forms can be structured such that one or more fields are not assigned names at all in the HTML, multiple fields are assigned the same name, or one or more fields are assigned dynamic names. This is mostly a matter of programming style and preference on the part of the Web designer responsible for creating the HTML documents making up the Web site. The static portion of such forms may be mapped by the system. Alternatively, fields may also be mapped according to their relative positions or locations in the form; if the structure of the form changes, however, the mapping will be inaccurate.

Figure 6:
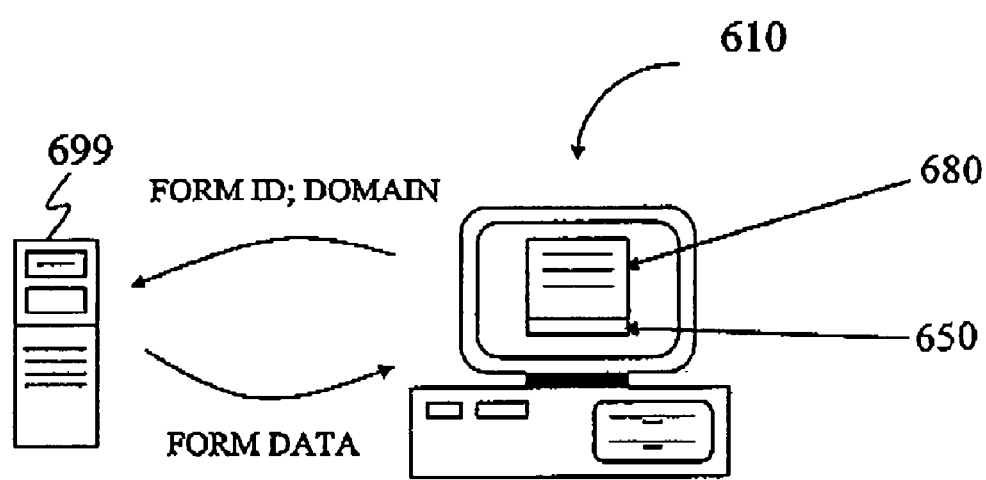
FIG. 6 is a simplified diagrammatic view of the interaction between the central server of the present invention and a form page of a typical Web site.

In operation, the form filling feature of the present invention employs both the program code at the central server as well as the code underlying the enhanced interface provided at the user's computer terminal. FIG. 6 is a simplified diagrammatic view of the interaction between the central server 699 of the present invention and a form page of a typical Web site visited by a user at a computer terminal 610. In FIG. 6, the form 680 corresponds to the form 580 discussed above with reference to FIG. 5. The standard Internet browser's capabilities have been expanded to include the utility window 650 which may correspond to the utility window 350. As discussed above with reference to FIG. 3, upon login with the central server 699, certain of the system utilities are imported into the utility window 650 by means of program code which may affect the appearance and operation of the utility window 650.

In this particular embodiment of the present invention, user interface with the form filling function is enabled, and may be presented to the user in the form of an operative button, such as button 351, or as an operative option in a menu, for example. The user may arrive at the page including the form 680 in different ways. For example, the user may simply be browsing and, during the course of the session on the Internet, happen across a page including a form. Alternatively, the user may follow a hyperlink provided in the utility window 650 to navigate automatically to a page containing a form.

When the user decides to complete a form, the form fill feature may be invoked through the utility window 650. Invoking the form fill software initiates a program script, imported into the utility window 650 upon login with the server 699, for parsing the HTML of the page which includes text strings representing the URL and the form 680. Text strings representing all the fields included in the form are concatenated with the domain name, all of which is extracted from the HTML, to create an identifier string. This identifier string is transmitted to the central server 699, where it is compared with the plurality of identifier strings recorded in the database to determine if the form has previously been mapped.

If the form has been mapped, the identifier string forwarded from the user's computer terminal 610 will exactly match one of the identifier strings in the database at the server 699, and the system may prepare the data for return to the user's computer 610. Programming routines at the central server 699 may perform required functions on the user data in the database before returning the data, in the appropriate format, to the user's computer terminal 610. For example, if the "name" information is formatted as a single field in the form to be filled, the server 699 may concatenate the first, middle, and last name fields extracted from the database and add spaces between each text string, thereby arranging the data in the format expected by the server to which the form will ultimately be submitted.

If the form has not previously been mapped, or if it has been modified since the last mapping, the identifier string forwarded to the central server 699 from the user's computer terminal 610 will not match any identifier strings in the database. The unrecognized identifier string may, however, be saved, and the system may attempt a reverse mapping as described below.

Faced with an unrecognized identifier string, the program code at the central server 699 first analyzes the identifier string and attempts to identify substrings thereof which represent known field names. In the case where the structure or arrangement of a previously mapped form has recently been altered slightly by the hosting Web site, for example, while the identifier string will not be an exact match with any in the database, analysis of that identifier string may ultimately reveal that most or all of the fields are recognizable, though presented in an order which has not previously been encountered by the system. Similarly, an unmapped form may have analogous structure and contain the same field names as a mapped form in the case where both forms are at respective Web sites hosted by the same entity or created by the same Web designer, for example. In any event, known field names may be filled with appropriate user data extracted from the data base and properly formatted.

Next, the program code embodied in the system attempts to identify potential meta types of logical data blocks from any field names which can be identified, thereby formulating a reasonable inference with respect to the entire structure of the unidentified form based upon what is reasonably certain.

For example, the system may be adapted to maintain a running log of the field names previously encountered in HTML forms as well as the user data to which those field names correspond. The system, therefore, may recognize that "Surname", "LastName", and "last_name", when encountered in a form, all represent the same field in the database which corresponds with the user's last name. When an unidentified form includes a field having one of these names, or something similar, for example "nameLAST", the system of the present invention may recognize that field and map that part of the unknown form accordingly. Further, the system may attempt to reconstruct a full meta type based upon the known field's presence. In this particular example, the fields proximal to "nameLAST" are likely to represent a first name or a middle name, for instance. In the case where "nameLAST" and "nameFIRST" are identified along with an unknown intervening field, the system of the present invention may attempt to fill that intervening field with a middle name or initial, even if the name assigned to the intervening field in the form's HTML is not recognized.

Those of skill in the art will appreciate that the foregoing "fuzzy" fill procedure may be implemented in the form of an heuristic algorithm adapted to analyze the field name strings, or parts thereof, in the HTML identifier string, and to compare those strings and substrings with the information already recorded in the database with respect to mapped forms. The hierarchical structure of a form defined above enables the system to piece together bits of known data into logical meta types based, in part, upon the vast store of information in the database and, in part, upon how that information is typically arranged in the most frequently encountered situations. Accordingly, the entire structure of a previously unknown form may potentially be determined in real time.

In operation, the program code at the central server 699 passes through the form identifier string and completes the necessary operations on the user data in order to fill the fields which can be identified. The extent to which completion of the form is possible is based largely upon what can be identified with certainty or readily inferred from the HTML structure. Even in the case of a mapped form, wherein every field in the entire form may be completed by the system, the form may not actually be submitted by the system.

In one preferred embodiment, for example, the programming code at the central server 699 may simply extract the appropriate user data from the database records and return that data to the user's computer terminal 610 for filling the form 680; the filled or partially filled form 680 may then be displayed to the user, who may alter, delete, or add information selectively. This embodiment provides two particular advantages: the user has an opportunity to delete or to modify optional information which the user does not wish to supply as specifically recorded in the database; and previously unmapped forms may be mapped according to the information provided by the user.

In the case of an unmapped form, the program code at the user's computer terminal may be adapted to parse the HTML when the form page is unloaded. Upon acknowledging the "on unload" event, which signifies when the user is attempting to submit the form, the program code at the user's computer may capture the data submitted by the user, and subsequently transmit the same to the server. Program routines at the server may then reverse engineer the structure of the form based upon what may be readily inferred given the data provided by the user for each field.

Similarly, even where the structure of the form has been mapped, in certain cases, the form may require information which the user has not previously supplied to the server; in this case, all the necessary data for completing the form may not be readily available in the central database. In addition to providing an interface prompting the user for such input and utilizing the same for completing the form, the system may be adapted to save that data in the appropriate location in the user's database record.

In yet another scenario, a browsing user, encountering a mapped form, may choose to input the required or requested user data and to submit the form manually. Upon recognizing the "on unload" event, the HTML may be parsed and the user's manually filled data be may forwarded to the central server. Since the form is mapped, the system may recognize the field names and the corresponding user data associated therewith; in the case where the user is submitting data which is not already recorded in the database, program scripts at the central server may match the data provided by the user with the known field names, and the newly-provided user data may be stored, subject to the user's approval, in the appropriate locations in the database record.

Alternatively, the form may request certain optional data which is currently recorded in the database, but which the user may not want to supply. As noted with respect to the embodiment described above, the form filling function may only complete the form, to the extent possible, while not actually submitting the completed form. The user, relieved of the burden of filling in all the fields manually, may still be required to review the completed form for accuracy, and may, at that time, delete optional data and alter the information provided in any given field. Alternatively, in the case where the system is adapted to submit the form automatically, the user is preferably prompted selectively to supply any optional data at the user's discretion.

It will be appreciated from the foregoing that, once the user has logged in to the registered account at the central server, the form filling feature provides a significant convenience. Simply by selecting the form fill option from the utility window, the user can complete an entire form or portions of a form automatically with little or no manual input. In addition, the system may recognize input from the user when a particular page is unloaded indicating that a form, which has been filled manually by the user, is being submitted independent of the form filling feature. In this manner, the system can "learn" from the user's experiences, mapping forms for future form fill operations invoked by other users.

The system of the present invention also offers appreciable convenience when a user desires to login to a particular registered account at an e-mail server or an e-commerce Web site, for example. A typical Web browser application offers a list, which may be edited, of the Web sites most frequently visited by the user. As commonly implemented, a "bookmarks" or "favorites" list merely enables the user to navigate to a particular site without having to type the URL of the site into the text box in the browser GUI; that is, the bookmark is only a navigational tool which is capable of no more than directing the browser to a specified address in cyber-space.

The present invention, on the other hand, combines the navigational utility of the typical bookmark with a customized form filling operation of a type similar to that described above. The net result of this combination is a "smart" bookmark, which not only navigates a user to the login page of a specified account, but also completes and submits the login form, thereby logging the user in to a registered account without further intervention by the user.

The interface for this login feature may be installed into the utility window upon login with the central server as described above with reference to FIG. 3. In this particular instance, the interface may comprise a drop-down menu, for example, which may include an operative option for setting up an account to be displayed as an independent selection in the menu.

In the same manner a user may maintain multiple e-mail accounts at a single e-mail server, a user may maintain more than one registered account at other types of servers, such as e-commerce Web sites, for example. The system of the present invention accommodates recordation of necessary data concerning multiple accounts in the same domain, corresponding to a home account and a work account, for example, at the same server. Conversely, an account at one site may entitle a registered user to login at a different Web site in an entirely different domain, perhaps operated by the same entity or a co-brand partner; that is, creating an account at one Web site may potentially entitle the registered user to access that Web site's partner sites in different locations using the same user name and password recognized by the site with which the user is registered. The system of the present invention is able to recognize these types of partnership accounts, at least with respect to mapped sites.

Since a plurality of accounts may be accessed through the interface provided in the utility window, for example, each account for which the login feature is invoked may be given a unique identifier, or nickname, to be displayed in the menu or list for identifying the account. In the case where a user is attempting to submit data concerning a second or subsequent account in the same domain, the program code at the central server, operating through the interface code at the user's computer terminal, may inform the user that an account already exists at the selected site, and prompt the user to confirm a new user name and password along with a different nickname for the new account.

As noted above, during a particular Web browsing session, a user need only select an account from the drop-down menu, for example, in order to invoke the program scripts which will log the user in to the selected registered account. Initially, however, the accounts for which the login feature is activated must be input so as to be recognized by the system. From the user's perspective, there are three potential scenarios requiring interface with the login feature in order to set up an account such that the login feature is fully operational with respect to that account in the future: the login form has already been mapped; the user invokes a "custom add" feature to set up a Web site account; or the user attempts to login to an account independent of the login feature.

In the first case, the login form for a particular Web site has already been mapped into the system as described above with respect to the form fill feature. The system, therefore, already knows the URL of the login page and the structure of the login form; this information is stored in a form database record associated with a specific form identifier string as described above. A list of recognized Web sites having login forms which are already mapped may be available to the user in the utility window, and the user may select one of the active options to navigate to a particular site's login page.

In this embodiment, the program code imported into the user's computer terminal parses the HTML of the login page and identifies the "on load" event, which is indicative of the page's arrival at the user's browser. Upon detection of the "on load" event, the form fill technology discussed above may be invoked; the HTML is parsed, the unique form identifier string is transmitted to the central server, and the program code at the server examines the user's database record to determine if a user name and password are recorded for the identified login form to be filled. If the account has not previously been recorded in the system, the form fill routine prompts the user for the user name and password associated with the particular account. The system not only completes the form with the data provided by the user, but also stores that data in the user's database record in association with the unique form identifier string. The form fill routine is thereby provided with all the necessary data for prospectively filling the form in its entirety.

The login feature of the present invention preferably includes the additional step of actually submitting the form. The program code at the user's computer terminal executes a program script which submits the form. An HTML page including a form usually includes an operative button or other mechanism for executing the submission script which unloads the page and delivers the HTML data to the server requesting the form. The login feature may include program code which simulates selection of the operative button in the HTML page. Accordingly, the form may be submitted under software control, thereby logging the user in to the selected account. With all of the requisite account data now stored in the central server, future login operations are simply a matter of selecting the account in the utility window interface.

Creating a program script which merely simulates selection of a button in HTML to submit a form, for example, is a relatively straightforward matter; where the form action is more sophisticated, however, the program script for simulating the inclusion of required parameters along with the form submission is correspondingly more complicated. In certain instances, the mechanism for submitting a given form to a Web server does not readily accommodate submission of the form through software intervention, or programmatically. For example, functional parameters, embedded in the HTML code which is returned to the server requesting the form, may be required to indicate the manner in which the submission is made; absence of these parameters results in an unsuccessful login attempt.

The system of the present invention is adapted to recognize complicated form actions, and may include program code to alter the action of the form which is to be submitted. In altering the form action, the submission created by the system may include required parameters which would otherwise be omitted if the form were submitted programmatically using an inferior script, such as one which merely simulates selection of a button. Those of skill in the art will appreciate that so modifying the form action is a matter of initially parsing the HTML to identify the required parameters and, in response, including text fields representing those parameters in the HTML which is submitted along with the form data.

In the second case of setting up a Web site account, the login form has not previously been mapped, but the user invokes a "custom add" feature from the utility window. Selecting the custom add feature initiates a program script which prompts the user to enter three necessary items of information: the URL of the login page; the user name under which the registered account is maintained; and the password associated with the account. Additionally, the user may enter a name to be displayed in the menu or list for identifying the account; alternatively, the system may assign or suggest a name for the account, subject to user approval, based upon the domain name in the URL of the login page.

The browser is navigated to the login page URL, the HTML is parsed, and the unique form identifier string is transmitted to the server. In this situation, however, since the login form has not been mapped, the program code at the central server cannot match the identifier string with any previously mapped form, and consequently, the system does not have any information as to the structure or arrangement of the login form. An heuristic algorithm is implemented at the central server to identify the nature and structure of the login form at the URL provided by the user.

The algorithm parses the HTML and searches for a login form having user name and password fields embedded in the HTML code. Since any given HTML page may have more than one form embedded in its code, the algorithm first endeavors to identify only the forms which have relatively few fields, for example, four or fewer; this is reasonable since most login forms only require a user name and password. Since the "password" field is distinctive in HTML code, the algorithm next identifies the presence any password fields and ignores any form which has more than one; such a form would most likely be a registration form (which typically asks the user to re-enter a password for verification), not a login form. When a short form having a single password field has been identified, the algorithm assumes that the field preceding the password field is the user name field.

Upon completion of the foregoing heuristic algorithm, the login form has been examined in sufficient detail to enable the form fill routine to fill out the form accurately, and the scenario reduces down to the first situation in which the login form had been previously mapped. The form fill script is invoked, the user may be prompted for user name and password data (which information is then preferably stored in the user's database record), and the form may be submitted. In an alternative embodiment, the custom add feature may be adapted not to submit the login form automatically, but rather to give the user the opportunity to confirm that the heuristic algorithm correctly mapped the form and to ensure that the user name and password data have been filled in the proper locations.

In the third case of setting up a Web site account, the user attempts to login to an account independent of the login feature. In this situation, the program code at the user's computer terminal captures the "on unload" event, and parses the HTML to determine if the user is submitting a login form by examining the unique form identifier string. Either the form has previously been mapped, in which case the scenario is similar to the first situation described above, or the form has not been mapped, in which case the scenario is treated as the custom add situation described above.

Irrespective of the manner in which the registered account is set up to function with the login feature, once the central server has been provided with all of the requisite data, subsequent login with respect to any registered account may be automatic upon selection of the desired account in the utility window interface. The program scripts at the user's computer terminal navigate the browser to the login page URL. Upon capture of the "on load" event, the form fill routine is invoked, sending the login form data to the central server, extracting the user name and password data from the appropriate database record associated with the login form's identifier string, and employing program scripts at the user's computer terminal to insert that user data into the form. Finally, a program script simulates selection of the submission option at the login page such that the form is submitted to the Web server, logging the user into the selected registered account automatically.

From the foregoing, it can be seen that a system designed in accordance with the present invention provides a versatile, efficient, and personalized expansion of the capabilities of an ordinary Web browser for specialized applications, particularly with respect to automating certain interactions which ordinarily must be completely manual. The preferred embodiments disclosed herein have been described and illustrated by way of example only, and not by way of limitation. Other modifications and variations to the invention will be apparent to those skilled in the art from the foregoing detailed disclosure. While only certain embodiments of the invention have been specifically described herein, it will be apparent that numerous modifications may be made thereto without departing from the spirit and scope of the invention.

What is claimed is:

1. A system for automating data transactions between computer servers; said system comprising:
   a first computer server maintaining a database having stored data recorded therein;
   program code at said first server for creating extracted data by selectively extracting said stored data responsive to a request; and
   additional program code at said first server for:
   concatenating strings representing all fields in a blank form to create an identifier string;
   identifying substrings in said identifier string that represent known field names and filling said known field names with extracted data;
   reconstructing a metatype of a logical data block based on the presence of one or more known fields in the block; and
   filling fields of said logical data block with appropriate data.

2. The system of claim 1 wherein said identifier string includes a URL (universal resource locator) for said form.

3. The system of claim 1 wherein said program code for reconstructing a metatype of a logical data block includes program code for:
   comparing unknown field names from said form with a running log at said first server of field names previously encountered; and
   mapping the data from a previously encountered field name that resembles an unknown field name to the unknown field name.

4. The system of claim 1 wherein said blank form comprises any of:
   a login form; and
   a registration form.

5. The system of claim 1 wherein said program code for reconstructing a metatype of a logical data block includes program code for identifying unknown field names based on proximity to fields having known field names.

6. The system of claim 1 wherein said first computer server permits creating a filled form using said extracted data to fill in said blank form.

7. The system of claim 1, wherein said program code includes program code for:
   creating a form map for an unknown form based on user data supplied during filling out said unknown form by said user.

8. The system of claim 1 further comprising:
an additional database maintained at said first computer server; said additional database having stored form data recorded therein;
said stored form data relating to forms required by at least one other computer server.

9. The system of claim 8 wherein said additional program code includes instructions for comparing data fields in said blank form with said stored form data recorded in said additional database.

10. The system of claim 9 further comprising:
form filling program instructions using a result of said comparing data fields in said blank form with said stored form data, for creating a filled form by filling in said blank form.

11. The system of claim 10 further comprising:
form submitting program instructions, using a result of said form filling program instructions, for automatically submitting said filled form to a second computer server.

12. The system of claim 8 wherein said stored form data includes parsed form data from said at least one other computer server.

13. The system of claim 1 wherein said additional program code includes instructions for parsing said blank form to identify which of said extracted data should be used to fill in at least a part of said blank form.

14. A method of automating data transactions between computer servers; said method comprising:
maintaining a database having stored data recorded therein at a first computer server;
selectively extracting said stored data responsive to a request;
obtaining a blank form;
parsing said blank form to identify all fields in said form;
concatenating strings representing all fields in said blank form to create an identifier string;
identifying substrings in said identifier string that represent known field names;
reconstructing a metatype of a logical data block based on the presence of one or more known fields in the block; and
creating a filled form by filling in fields of said blank form procedure by filling said known fields in with extracted data and filling fields of said logical data block with appropriate data.

15. The method of claim 14 wherein said identifier string includes a URL (universal resource locator) for said form.

16. The method of claim 14 wherein reconstructing a metatype of a logical data block based on the presence of one or more known fields in the block includes:
comparing unknown field names from said form with a running log at said first server of field names previously encountered; and
mapping the data from a previously encountered field name that resembles an unknown field name to the unknown field name.

17. The method of claim 14 wherein reconstructing a metatype of a logical data block includes any of:
identifying unknown field names based on proximity to fields having known field names:
reconstructing a metatype of a logical data block includes program code for identifying unknown field names based on proximity to fields having known field names.

18. The method of claim 14 wherein said obtaining a blank form includes receiving any of registration form data and login form from a second computer server.

19. The method of claim 14 further comprising:
creating a form map for an unknown form based on user data supplied during filling out Said unknown form by said user.

20. The method of claim 14 further comprising:
maintaining an additional database at said first computer server; said additional database having stored form data recorded therein;
said stored form data relating to forms required by at least one other computer server.

21. The method of claim 20 wherein said parsing includes comparing data fields in said blank form with said stored form data recorded in said additional database.

22. The method of claim 20 wherein said maintaining an additional database includes parsing form data from said at least one other computer server.

23. A system for automating data transactions between computers; said system comprising;
a first computer maintaining a database having stored data recorded therein;
program code at said first computer for creating extracted data by selectively extracting said stored data said stored data responsive to a request from a second computer; and
additional program code at said first computer
concatenating strings representing all fields in a blank form to create an identifier string;
identifying substrings in said identifier string that represent known field names and filling said known field names with extracted data;
reconstructing a metatype of a logical data block based on the presence of one or more known fields in the block; and
filling fields of said logical data block with appropriate data.

24. The system of claim 23 wherein said program code for reconstructing a metatype of a logical data block includes program code for:
comparing unknown field names from said form with a running log at said first server of field names previously encountered; and
mapping the data from a previously encountered field name that resembles an unknown field name to the unknown field name.

25. The system of claim 23, wherein said identifier string includes a URL (universal resource locator) for said form.

26. The system of claim 23 wherein said program code for reconstructing a metatype of a logical data block includes program code for identifying unknown field names based on proximity to files having known field names.

27. The system of claim 23 wherein said blank form is a login form.

28. The system of claim 23 wherein said blank form is a registration form.

29. The system of claim 23 further comprising program code at said second computer for
creating a form map for an unknown form based on user data supplied during filling out said unknown form by said user.

30. The system of claim 29 wherein said program code at said second computer includes instructions for submitting said filled form to a third computer.

31. The system of claim 23 further comprising:
an additional database maintained at said first computer; said additional database having stored form data recorded therein;

said stored form data relating to forms required by at least one computer server.

32. The system of claim 31 further including additional program code at said first computer for comparing data fields in said blank form with said stored form data recorded in said additional database.

33. The system of claim 32 further comprising:

form filling program instructions at said second computer using a result of said comparing data fields in said blank form with said stored form data, for creating a filled form by filling in said blank form.

34. The system of claim 33 further comprising:

form submitting program instructions at said second computer, using a result of said form filling program instructions, for automatically submitting said filled form to a third computer.

35. The system of claim 31 wherein said stored form data includes parsed form data from said at least one computer server.

* * * * *